US012801923B2

(12) United States Patent
Purica et al.

(10) Patent No.: US 12,801,923 B2
(45) Date of Patent: Nov. 17, 2026

(54) DEVICE FOR PREDICTING A VALUE OF A CONTROL VARIABLE IN A CONTROL SYSTEM

(71) Applicant: THALES, Courbevoie (FR)

(72) Inventors: Andrei Purica, Rungis (FR); Béatrice Pesquet-Popescu, Rungis (FR)

(73) Assignee: THALES, Courbevoie (FR)

( * ) Notice: Subject to any disclaimer, the term of this patent is extended or adjusted under 35 U.S.C. 154(b) by 1193 days.

(21) Appl. No.: 17/631,487

(22) PCT Filed: Jul. 28, 2020

(86) PCT No.: PCT/EP2020/071207
§ 371 (c)(1),
(2) Date: Jan. 30, 2022

(87) PCT Pub. No.: WO2021/018865
PCT Pub. Date: Feb. 4, 2021

(65) Prior Publication Data

US 2022/0277201 A1 Sep. 1, 2022

(30) Foreign Application Priority Data

Jul. 31, 2019 (FR) ...................................... 1908665

(51) Int. Cl.
*G06N 3/084* (2023.01)

(52) U.S. Cl.
CPC .................................... *G06N 3/084* (2013.01)

(58) Field of Classification Search
CPC ...................................................... G06N 3/084
See application file for complete search history.

(56) References Cited

U.S. PATENT DOCUMENTS 10,853,696 B1 * 12/2020 Luo .......................... G06N 3/04
2002/0002548 A1 * 1/2002 Roundtree ........... G06Q 10/109

OTHER PUBLICATIONS

Franceschini, S. et al., "Cascaded neural networks improving fish species prediction accuracy: the role of the biotic information," Scientific Reports vol. 8, No. 4581 (2018) pp. 1-12. (Year: 2018).*

(Continued)

*Primary Examiner* — Brian M Smith
(74) *Attorney, Agent, or Firm* — Baker Hostetler

(57) ABSTRACT

The embodiments of the invention provide a device for predicting the value of a variable intended to be used by a computer-implemented control system, the variable depending on multiple parameters, the parameters comprising a non-explicit parameter. Advantageously, the prediction device comprises a first neural network-based predictor configured so as to compute an estimate of the non-explicit parameter and a second neural network-based predictor configured so as to compute an estimate of the value of the variable from the estimate of the non-explicit parameter, the two predictors receiving an input dataset, each neural network being associated with a set of weights. The prediction device is configured so as to apply a plurality of iterations of a single learning function to the two predictors, the learning function comprising: a forward propagation block for computing, on the basis of the input data of the two predictors, the gradient of a minimization function for minimizing a cost function of the first predictor; and a backpropagation block for updating the weights of the neural networks of the two predictors by backpropagating the gradients computed by the forward propagation block. The prediction device estimates the value of the variable to be predicted at a future time, after the iterations of the learning function, by applying input data to the neural networks of the two predictors and using the weights updated by the learning function.

14 Claims, 9 Drawing Sheets

(56) References Cited

OTHER PUBLICATIONS

Morfi, V. et al., "Deep learning on low-resource datasets," downloaded from pre-prints.org <www.preprints.org/frontend/manuscript/aaa90d42b32e3a281b66563c9ccb2717/download_pub> (Jul. 10, 2018) 15 pp. (Year: 2018).*
Al, Y. et al., "A deep learning approach to predict the spatial and temporal distribution of flight delay in network," Journal of Intelligent and Fuzzy Systems, vol. 37, Issue 5 (Jun. 7, 2019) pp. 6029-6037. (Year: 2019).*
Labao, A. et al., "Cascaded deep network systems with linked ensemble components for underwater fish detection in the wild," Ecological Informatics, vol. 52 (2019) pp. 103-121. (Year: 2019).*
Pang, Y. et al., "A recurrent neural network approach for aircraft trajectory prediction with weather features from sherlock," AIAA Aviation 2019 Forum (Jun. 14, 2019) 14 pp. (Year: 2019).*
Ng, A., "Sparse autoencoder," Stanford CS294A Lecture Notes (2011) 19 pp. (Year: 2011).*
Sodsong, et al., "Short-Term Solar PV Forecasting Using Gated Recurrent Unit with a Cascade Model", 2019 International Conference on Artificial Intelligence in Information and Communication (ICAIIC), pp. 292-297, 2019.
Watts, et al., "Comparing ensemble and cascaded neural networks that combine biotic and abiotic variables to predict insect species distribution", Ecological Informatics, vol. 3, Issue 6, pp. 354-366, 2008.
Ayhan, et al., "Predicting Estimated Time of Arrival for Commercial Flights", Proceedings of the 24th ACM SIGKDD International Conference on Knowledge Discovery & Data Mining, pp. 33-42, 2018.
Jordan, et al., "Serial Order: A Parallel Distributed Processing Approach", Time-to Contact, vol. 121, pp. 471-495, 1986.
Karl, et al., "Deep Variational Bayes Filters: Unsupervised Learning of State Space Models from Raw Data", ArXiv.Org, Cornell University Library, arXiv:1605.06432v3, 2017.

* cited by examiner

DEVICE FOR PREDICTING A VALUE OF A CONTROL VARIABLE IN A CONTROL SYSTEM

CROSS-REFERENCE TO RELATED APPLICATIONS

This application is a National Stage of International patent application PCT/EP2020/071207, filed on Jul. 28, 2020, which claims priority to foreign French patent application No. FR 1908665, filed on Jul. 31, 2019, the disclosures of which are incorporated by reference in their entirety.

FIELD OF THE INVENTION

Background

The present invention relates in general to control systems, and in particular to a device and a method for predicting the value of a variable intended to be used by a control system.

The performance of certain systems, such as control systems, may be significantly enhanced or optimized by using estimates (or predictions) of the value that certain variables will take at a future time. Value predictions make it possible to anticipate events and to put in place adjustment mechanisms in order to prevent these events or optimize the operation of the system. For example, in the field of air transport, the estimate of the time of arrival of aircraft at a given arrival airport is used by air traffic control systems to optimize air traffic at this airport. In the ballistic field, a projectile impact estimate may be used to activate control processes and/or adjustment mechanisms. In yet other fields, it may be useful to predict the trajectory of moving objects in order to activate various maneuvers or control mechanisms.

Conventionally, to predict the final value that such a variable will take at a future time (for example time of arrival), an initial estimate of this value is computed before triggering of the event (for example a flight) which causes the variable to vary, the event occurring between an initial time and the future time. It is known to perform one or more additional estimates of the value of the variable at the future time, during the occurrence of the event, taking into account the variation in the parameters on which the variable depends. The various estimates are generally performed using equations, predictors or estimation methods based on statistical models and/or historical data.

However, the known solutions for estimating such variables lack accuracy.

SUMMARY OF THE INVENTION

The invention aims to improve the situation. To this end, what is proposed is a device for predicting the value of a variable intended to be used by a computer-implemented control system, the variable depending on multiple parameters, the parameters comprising a non-explicit parameter. Advantageously, the prediction device comprises a first neural network-based predictor configured so as to compute an estimate of said non-explicit parameter and a second neural network-based predictor configured so as to compute an estimate of said value of the variable from the estimate of the non-explicit parameter, the two predictors receiving an input dataset, each neural network being associated with a set of weights. The prediction device is configured so as to apply a plurality of iterations of a single learning function to the two predictors, the learning function comprising: The invention aims to improve the situation. To this end, what is proposed is a device for predicting the value of a variable intended to be used by a computer-implemented control system, the variable depending on multiple parameters, the parameters comprising a non-explicit parameter. Advantageously, the prediction device comprises a first neural network-based predictor configured so as to compute an estimate of said non-explicit parameter and a second neural network-based predictor configured so as to compute an estimate of said value of the variable from the estimate of the non-explicit parameter, the two predictors receiving an input dataset, each neural network being associated with a set of weights. The prediction device is configured so as to apply a plurality of iterations of a single learning function to the two predictors, the learning function comprising:

- a forward propagation block, configured so as to compute, on the basis of the input data of the two predictors, the gradient of a minimization function for minimizing a cost function of the first predictor;
- a backpropagation block, configured so as to update the weights of the neural networks of the two predictors by backpropagating the gradients computed by the forward propagation block.

The prediction device is configured so as to estimate said value of the variable at a future time, after said iterations of the learning function, by applying input data to the neural networks of the two predictors using the weights updated by the learning function.

In one embodiment, the backpropagation block may be configured so as to update the weights of the second predictor, while the weights of the first predictor are fixed.

In one embodiment, the first predictor may comprise a neural network receiving generic input data, the backpropagation block.

The first predictor may comprise a set of elementary neural networks each receiving specific input data.

Advantageously, the second predictor may be configured so as to apply the predicted value at input of the first predictor.

In one embodiment, the first predictor may be configured so as to broadcast the output value of the non-explicit parameter to external systems.

In one embodiment, the control system is an air traffic control system, the prediction device then being configured so as to predict the time of arrival of a given aircraft taking a trajectory between a departure point and an arrival point, the non-explicit parameter relating to the arrival point of the aircraft.

In such an embodiment, the non-explicit parameter may be the level of congestion at the arrival point. As a variant, the non-explicit parameter may be a global delay parameter.

The input data of the first predictor may comprise features relating to the given aircraft, information relating to aircraft arriving at the arrival point, and a number representing the maximum number of aircraft associated with the arrival point.

The input data relating to aircraft arriving at the arrival point may comprise the number and type of aircraft expected to land at the arrival point per time range.

The input data of the second predictor may comprise features relating to the given aircraft, information relating to aircraft arriving at the arrival point, and capacity information associated with the arrival point.

The input data of the second predictor may furthermore comprise a time slot representing the expected landing range for the given aircraft, and a history of values of the non-explicit parameter over a past time period.

The embodiments thus improve the prediction of the value of variables depending on a non-explicit parameter, by using two neural networks that are trained jointly, the predicted variable thus being more accurate and improving the control achieved by control systems using the predicted value.

BRIEF DESCRIPTION OF THE DRAWINGS

Other features and advantages of the invention will become apparent with the aid of the following description and the figures of the appended drawings, in which.

DETAILED DESCRIPTION OF THE APPLICATION

Figure 1:
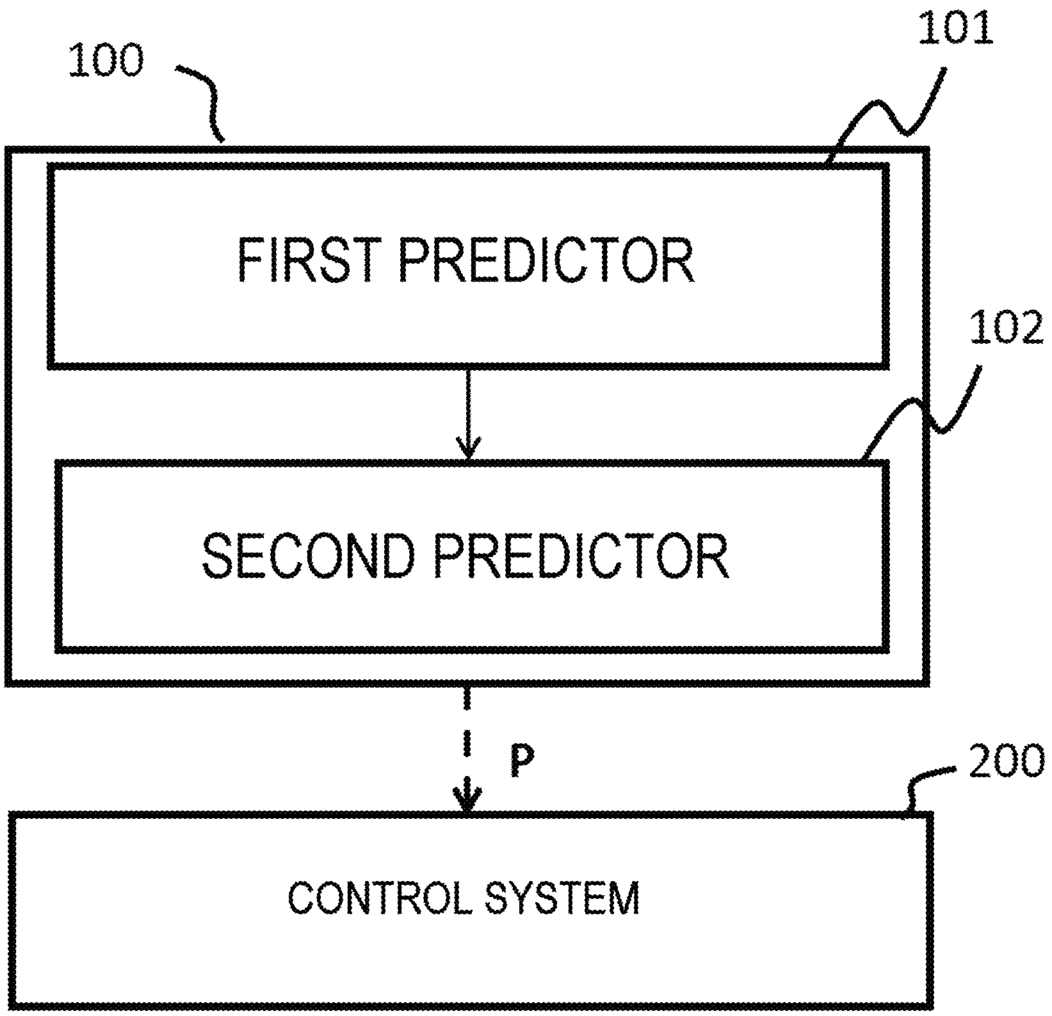
FIG. 1 shows one example of an environment using a prediction device, according to some embodiments of the invention.

FIG. 1 shows one example of an environment using a prediction device 100, according to some embodiments of the invention.

The prediction device 100 is configured so as to compute (or predict) an estimate of the value that a variable P (also called 'control variable') will take at a final time in response to the triggering or the occurrence of an event between an initial time Ti and a final time Tf. The variable P depends on a plurality of parameters comprising at least one 'non-explicit' parameter Q. The predicted value P is intended to be used by a computer-implemented control system 200 for optimization purposes.

As used here, a 'non-explicit' parameter refers to a parameter having no ground truth, such as for example a parameter having no explicit formula, not defined by a formula or values and/or for which only the link with the other parameters on which the variable P depends is known. A 'non-explicit' parameter may also be defined as a parameter computed using a data-based method.

In one exemplary application of the invention to an air traffic control system, the predicted variable may be the estimated time of arrival ETA (ETA being the acronym for "Estimated Time of Arrival") of an aircraft at a given airport (destination airport), for a given flight from a departure airport, the event being the flight that takes place between the take-off time (initial time Ti) and the time of arrival (final time Tf). In such an example, the predicted variable P depends on a set of parameters relating to the event (such as the flight plan, the weather on the route of the aircraft, etc.), to data relating to past occurrences of the event (for example historical data regarding one or more parameters relating to the flight over given past periods). In such an exemplary application of the invention to an air traffic control system 200, the non-explicit parameter Q may for example be a parameter of an instantaneous global delay at the arrival airport.

According to the embodiments of the invention, the prediction device 100 comprises a first neural network-based predictor 101 configured so as to compute an estimate of the 'non-explicit' parameter Q (for example, the parameter of an instantaneous global delay at the arrival airport for a prediction of an ETA) and a second neural network-based predictor 102 configured so as to compute an estimate (or prediction) of the value P (for example ETA) from the estimate of the non-explicit parameter Q performed by the first predictor 101. The two predictors 101 and 102 are configured so as to receive an input dataset. Each neural network corresponding to the predictors 101 and 102 is also associated with a set of weights.

The non-explicit parameter Q, delivered at output of the first predictor 101, may for example be a data vector. The non-explicit parameter Q supplied by the first predictor 101 is intended to improve the estimate performed by the second predictor.

Figure 2:
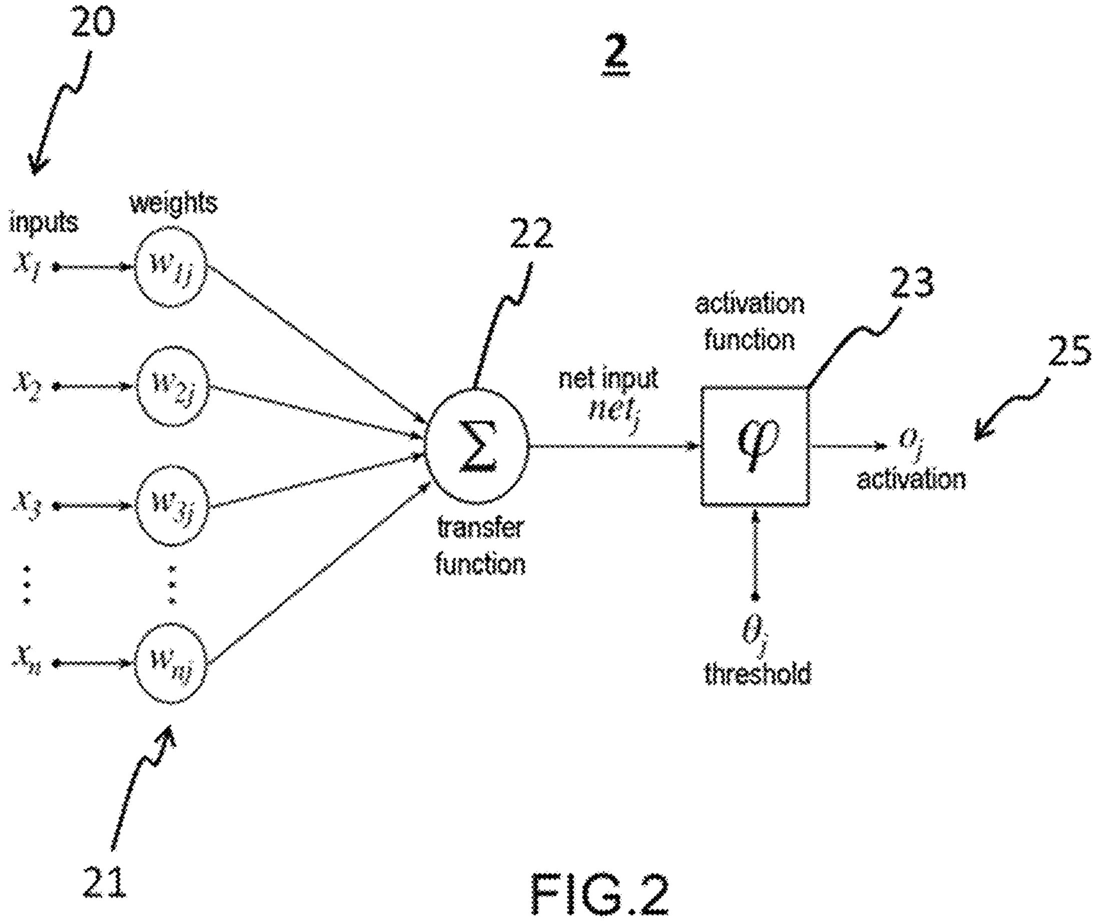
FIG. 2 is a diagram showing one example of a neural network used to implement a predictor of the prediction device, according to one embodiment.

FIG. 2 is a diagram showing the neural network corresponding to each predictor 101 or 102.

To make the embodiments of the invention easier to understand, a few definitions or concepts relating to neural networks are detailed below.

A neural network is a computational model that imitates the operation of biological neural networks. A neural network 2 comprises neurons interconnected with one another by synapses that are generally implemented in the form of digital memories (resistive components for example). A neural network 2 may comprise a plurality of successive layers, comprising an input layer carrying the input signal and an output layer carrying the result of the prediction performed by the neural network (result of the network), and one or more intermediate layers. The first input layer contains dummy neurons that transmit the inputs that are provided to the network. Each layer of a neural network takes its inputs from the outputs of the preceding layer. The number of neurons in each layer is equal to the number of neuron inputs in the next layer. A given layer of the neural network 2 is thus formed of a set of generalization neurons taking their inputs from the neurons of the preceding layer.

The signals propagated at input and at output of the layers of the network may be digital values (information coded in the value of the signals), or electrical pulses in the case of pulse coding (information coded temporally in the order of arrival of the pulses or depending on the frequency of the pulses). In the case of pulse coding, the pulses may originate from a sensor.

As shown in FIG. 2, a neural network 2 comprises an input dataset 20 (also called 'input coefficients'), denoted xi, and output data 25 (also called 'output coefficients'), denoted Oj.

The output coefficients Oj correspond to the output values of the neurons of the neural network 2. The output values Oj are computed from the inputs xi and the synaptic weights 21, denoted Wij.

Each output coefficient Oj is computed by applying an activation function φ to the input coefficients xi (block 23).

Each neuron of the neural network is configured so as to compute a weighted sum of its inputs xi (20) using a combination function Σ (block 22) and the weights Wij (block 21), before applying the activation function φ (block 23) to this resultant weighted sum so as to produce its output Oj:

As used here, a 'non-explicit' parameter refers to a parameter having no ground truth, such as for example a parameter having no explicit formula, not defined by a formula or values and/or for which only the link with the other parameters on which the variable P depends is known. A 'non-explicit' parameter may also be defined as a parameter computed using a data-based method.

In one exemplary application of the invention to an air traffic control system, the predicted variable may be the estimated time of arrival ETA (ETA being the acronym for "Estimated Time of Arrival") of an aircraft at a given airport (destination airport), for a given flight from a departure airport, the event being the flight that takes place between the take-off time (initial time Ti) and the time of arrival (final time Tf). In such an example, the predicted variable P depends on a set of parameters relating to the event (such as the flight plan, the weather on the route of the aircraft, etc.), to data relating to past occurrences of the event (for example historical data regarding one or more parameters relating to the flight over given past periods). In such an exemplary application of the invention to an air traffic control system 200, the non-explicit parameter Q may for example be a parameter of an instantaneous global delay at the arrival airport.

According to the embodiments of the invention, the prediction device 100 comprises a first neural network-based predictor 101 configured so as to compute an estimate of the 'non-explicit' parameter Q (for example, the parameter of an instantaneous global delay at the arrival airport for a prediction of an ETA) and a second neural network-based predictor 102 configured so as to compute an estimate (or prediction) of the value P (for example ETA) from the estimate of the non-explicit parameter Q performed by the first predictor 101. The two predictors 101 and 102 are configured so as to receive an input dataset. Each neural network corresponding to the predictors 101 and 102 is also associated with a set of weights.

The non-explicit parameter Q, delivered at output of the first predictor 101, may for example be a data vector. The non-explicit parameter Q supplied by the first predictor 101 is intended to improve the estimate performed by the second predictor.

FIG. 2 is a diagram showing the neural network corresponding to each predictor 101 or 102.

To make the embodiments of the invention easier to understand, a few definitions or concepts relating to neural networks are detailed below.

A neural network is a computational model that imitates the operation of biological neural networks. A neural network 2 comprises neurons interconnected with one another by synapses that are generally implemented in the form of digital memories (resistive components for example). A neural network 2 may comprise a plurality of successive layers, comprising an input layer carrying the input signal and an output layer carrying the result of the prediction performed by the neural network (result of the network), and one or more intermediate layers. The first input layer contains dummy neurons that transmit the inputs that are provided to the network. Each layer of a neural network takes its inputs from the outputs of the preceding layer. The number of neurons in each layer is equal to the number of neuron inputs in the next layer. A given layer of the neural network 2 is thus formed of a set of generalization neurons taking their inputs from the neurons of the preceding layer.

The signals propagated at input and at output of the layers of the network may be digital values (information coded in the value of the signals), or electrical pulses in the case of pulse coding (information coded temporally in the order of arrival of the pulses or depending on the frequency of the pulses). In the case of pulse coding, the pulses may originate from a sensor.

As shown in FIG. 2, a neural network 2 comprises an input dataset 20 (also called 'input coefficients'), denoted xi, and output data 25 (also called 'output coefficients'), denoted Oj.

The output coefficients Oj correspond to the output values of the neurons of the neural network 2. The output values Oj are computed from the inputs xi and the synaptic weights 21, denoted Wij.

Each output coefficient Oj is computed by applying an activation function φ to the input coefficients xi (block 23).

Each neuron of the neural network is configured so as to compute a weighted sum of its inputs xi (20) using a combination function Σ (block 22) and the weights Wij (block 21), before applying the activation function φ (block 23) to this resultant weighted sum so as to produce its output Oj:

$$O_j=\varphi(\Sigma_i x_i \cdot W_{ij})$$

The activation function φ may take various values depending on the value of the weighted sum of the weights of the neural network with respect to a threshold (also called 'bias'):

if the weighted sum of the weights of the network is less than a threshold, the neuron is said to be 'non-active': the output of the neuron may then be set to a first value V1 (such as V1=0 or −1);

if the weighted sum of the weights of the network is close to the threshold, the neuron is in a transition phase;

if the weighted sum of the weights of the network is greater than the threshold, the neuron is said to be 'active': the output of the neuron may then be set to a second value V2 (such as V2=1).

The threshold therefore represents the threshold from which a neuron will emit a signal.

The neuron activation function φ may for example be a sigmoid or thresholding function capable of introducing non-linearity.

The input signal thus propagates from one layer to the next of the neural network until it reaches the output, activating or not activating neurons as it goes.

The synaptic weights may be determined through learning in a learning phase. Random values are initially assigned to the weights of the neural network, and then a set of data xi are used to carry out the learning. Training a neural network consists in determining the optimum values of the synaptic weights, for each neuron of the neural network, from the last layer of the network to the first, using a learning function.

The learning phase may implement a plurality of iterations of the learning function, each iteration comprising a forward propagation step and a backpropagation step in order to correct errors between the outputs obtained in the forward propagation phase and the outputs expected for the input sample under consideration.

The learning phase thus makes it possible to compare the obtained output with the expected output (in the case of a supervised method), and, based on this comparison, to update the connections between the neurons represented by the synaptic weights in order to improve the final result (the weights may be modified so as to reinforce or inhibit the connections between neurons).

In the forward propagation phase, input datasets are used to implement the learning. Each dataset forming a sample (vector x=[x1, . . . xn]) is associated with desired values (or expected values). The signal corresponding to the input sample is propagated forward through the layers of the neural network starting from the first layer, from one layer (k−1) to the next layer (k) until the last layer. In the forward propagation phase, the activation function φ and the synaptic weights connecting the neurons of a preceding layer (k−1) and a following layer (k) are used.

When the forward propagation has finished, a result y ($y=[y_1, \ldots, y_i, \ldots y_N]$) is obtained at the output.

In the backpropagation phase, any errors obtained by a neuron are backpropagated to its synapses and to the neurons connected thereto. Advantageously, the backpropagation may be gradient backpropagation for modifying the synaptic weights taking into account their impact on the errors that are generated. The synaptic weights that contribute to generating a major error may thus be modified more significantly than the weights that generated a less major error.

In a gradient backpropagation phase, for each neuron of the output layer, the error $e_i^{output}$ between the output yi computed by the neural network and the expected output ti for the sample under consideration is determined using the derivative of the activation function φ'. The error is then backpropagated from the last layer, from layer to layer, to the first layer. During the backpropagation of the error signal, the synaptic weights are then modified by a gradient descent algorithm.

Each iteration of the learning function thus makes it possible, from a sample at input of the network, to compute the output of the network, to compare it with the expected output and to backpropagate an error signal in the network in order to modify the synaptic weights.

For example, considering a neural network used for image classification, in each iteration of the learning function, during the forward propagation phase, examples of each class are supplied at input of neural network 2 (input data) and the output supplied by the neural network in response to these input data represents the number of the class under consideration. In the gradient backpropagation phase, the network is then trained by the gradient descent algorithm to minimize the error between the obtained output and the expected output (by applying a cost minimization function), thereby leading to the weights of the neurons being modified in each iteration of the learning algorithm.

The duration of the learning phase may depend on the size of the database storing the samples used for learning and on the size of the network. It may therefore be relatively long.

After the learning phase, what is called a generalization phase, which is faster, is implemented. In the generalization phase, the weights learned in the learning phase are used (static neural network in which the weights are fixed). Input data are presented to the neural network, and a response from the neural network is obtained (for example representing the number of the class containing the input data for a classification network).

Advantageously, the prediction device 100 according to the embodiments of the invention is configured so as to apply a single learning function to the two predictors 101 and 102 in order to train them jointly.

Figure 3:
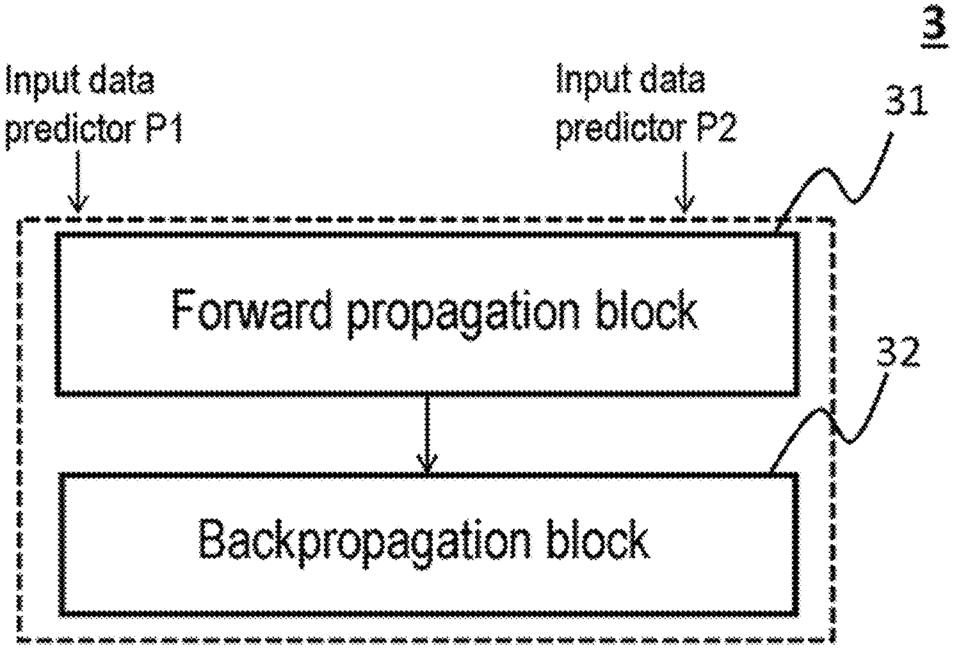
FIG. 3 is a diagram illustrating the learning function implemented in order to jointly train two neural networks corresponding to two predictors of the prediction device, according to some embodiments.

FIG. 3 is a diagram illustrating the learning function implemented in order to jointly train the two neural networks 2A and 2B (jointly designated by the reference '2' in FIG. 2) corresponding to the predictors 101 and 102.

The joint learning function 3 applied to the two predictors 101 and 102 comprises two blocks 31 and 32 that are called successively in each iteration of the learning function:

a forward propagation block 31 configured so as to compute, in each iteration, the gradient of a set of minimization functions for minimizing the cost function of the first predictor 101 (P2), in response to the applied input data of the two predictors 101 and 102;

a backpropagation block 32 configured so as to update the weights of the neural networks of the two predictors 101 and 102 by backpropagating the gradients computed by the forward propagation block, in the current iteration.

The cost function of the first predictor 101 may be for example the squared error on the learning base, which consists in minimizing the sum of the squares of the errors between the value yi obtained at output of the neural network 2A and the expected value ti at output of the neural network 2A. As a variant, the cost function of the first predictor 101 may be cross entropy. Those skilled in the art will however understand that the cost function of the first predictor 101 is not limited to the squared error or to cross entropy, and may be defined by other functions.

In one embodiment, the minimization of the cost function of the first predictor 101 uses the computation of the gradient of the cost function with respect to the weights of the network. The gradient may be defined as the sum of all of the partial gradients computed for each of the examples in the learning base:

$$\nabla J(w) = \sum_{i=1}^{N} \nabla J^i(w)$$

The partial gradient $\nabla J^i(w)$ may be computed using the backpropagation algorithm that uses the difference between the obtained output yi and the expected output ti (error yi−ti=ei), the formula depending on the cost function that is used.

The weights of the two neural networks 2A and 2B of the predictors 101 and 102 may be modified after each partial gradient computation or alternatively after the computation of the total gradient.

The prediction device 100 is furthermore configured so as then to implement a generalization phase in which the synaptic weights thereby updated are set. In the generalization phase, the prediction device 100 applies input data received at input of the neural networks of the two predictors 101 and 102 and computes the response to these inputs using the weights determined during the learning phase, thereby supplying an estimate (or prediction) of the value of the variable P (for example ETA).

The rest of the description will be given with reference to one exemplary application of the invention to predicting the time of arrival of an aircraft (ETA). However, those skilled in the art will easily understand that the invention applies similarly to predicting other parameters whose value depends on a non-explicit parameter, the predicted parameter P and the non-implicit parameter Q depending on the nature of the control system 200. For example, the invention may be applied to predicting the time of arrival at another intermediate point of the trajectory of the aircraft ETO (acronym for 'Estimated Time of Overflight').

Predicting 4D trajectories is a major challenge in many fields. In particular, predicting the time of arrival ETA of an aircraft makes it possible notably to optimize the management of aircraft flows using an air traffic control system 200. However, it is useful to be able to have a prediction that is as reliable as possible in order to be able to deduce therefrom a prediction of the times at which aircraft cross from one sector to another or to predict flight delays.

Conventionally, the trajectory of an aircraft between a departure airport and an arrival airport (flight plan) is estimated by an airline, based on available information relating to the departure and arrival airports, weather conditions and aircraft features. For example, the flight plan of an aircraft is conventionally planned taking into account information available at the departure and arrival airports, weather forecasts on the route of the aircraft, the mass of the aircraft and the aircraft's fuel. In the prior art, the flight plans are then transmitted before the aircraft departs and processed by the air traffic control center ATC. These flight plans may be updated en-route based on events occurring during the journey, such as exceptional weather conditions, and/or incidents en route or at the arrival airport. In existing approaches, the updates are then performed by operators between the various ATC centers involved in the flight (arrival ATC center, departure ATC center). Such approaches may be supplemented by computing an estimated time of arrival from historical flight data, representing data relating to flights taken between the departure airport and the arrival airport over a past time period, such as weather conditions and air traffic conditions observed on such past flights. However, ETAs conventionally computed on the basis of formulas and/or historical data lack accuracy.

The prediction device 100 according to the embodiments improves the prediction of the ETA by using the two predictors 101 and 102 that interact and are trained jointly by a single learning function. The prediction device may thus supply a prediction of the ETA that can be used by an air traffic control system to optimize the traffic in the arrival airport.

Figure 4:
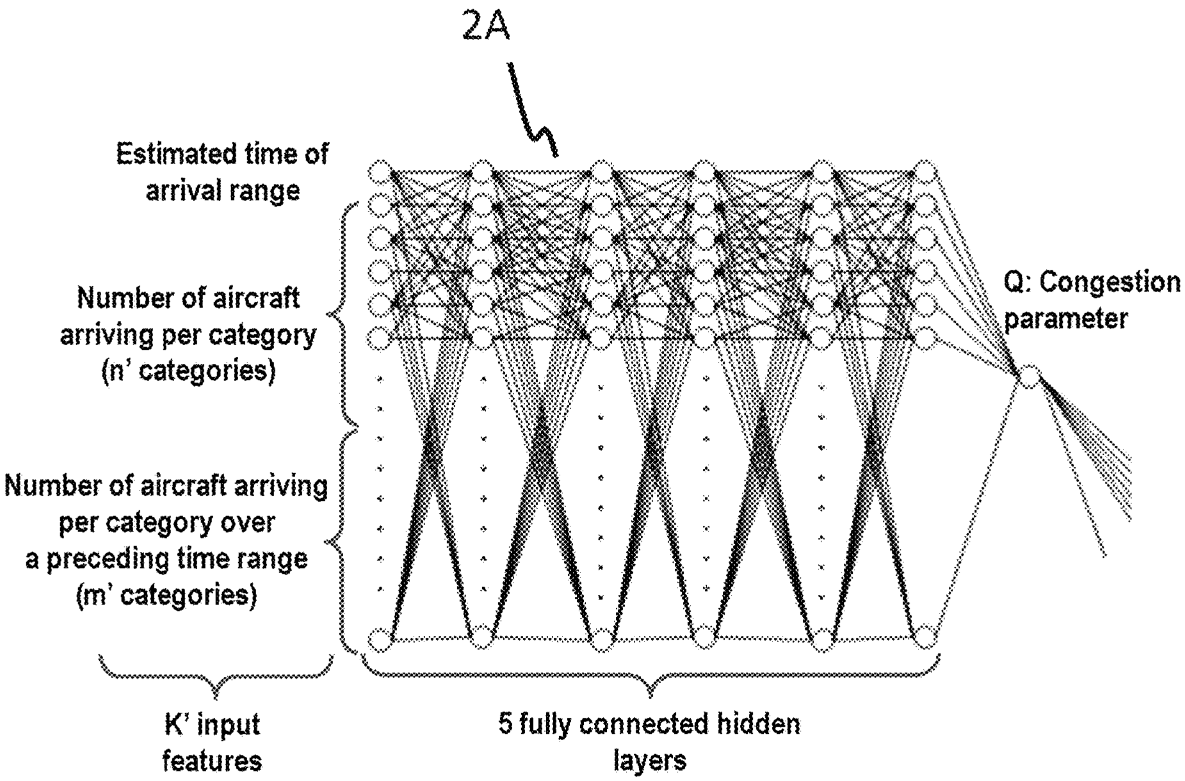
FIG. 4 shows the first neural network-based predictor, in one exemplary application of the invention to predicting the time of arrival of an aircraft.

FIG. 4 shows the first neural network-based predictor 101, in one exemplary application of the invention to predicting the estimated time of arrival ETA of an aircraft on a route between an arrival airport and a departure airport.

The first predictor 101 is used to predict the non-explicit parameter Q, which may represent for example the instantaneous global delay at the arrival airport or a parameter regarding congestion levels at the arrival airport, such as congestion at the arrival airport (global congestion parameter).

The first predictor 101 may receive, at input, information relating to estimates computed for the aircraft under consideration and to a set of aircraft (hereinafter called "arriving aircraft") whose arrival is scheduled at the same arrival airport as the aircraft under consideration, such as:

- an estimated range of aircraft times of arrival for the aircraft in question;
- the number of aircraft arriving per category in the current time range;
- the number of aircraft per category in the preceding time range.

The first predictor 101 may more generally take into account the capacity of the arrival airport and the traffic information provided at all times (number of aircraft with the same ETA).

The first predictor 101 thus continuously supplies a future prediction of the non-explicit parameter Q (for example instantaneous global delay parameter or congestion parameter). In one embodiment in which the non-explicit parameter is the congestion parameter, the outputs of the first predictor 101 may be represented in the form of a prediction table supplying the congestion parameter for the arrival airport per future time interval. The time interval may be a future time range corresponding to the upcoming hours with respect to the current time (corresponding to the time when the prediction method is launched by the first predictor 101).

FIG. 4 shows one exemplary implementation of the neural network 2A of the first predictor 101, in one exemplary application of the invention to estimating the time of arrival of an aircraft.

The neural network 2A of the first predictor 101 may be activated by a set of inputs that may comprise information about the capacity of the arrival airport (for example number of airport runways, runway status indicator, etc.), outputs of arrival management systems configured so as to manage and optimize aircraft arrivals. The output of the first predictor 101 (non-explicit parameter Q) may be a congestion level parameter such as an instantaneous global delay parameter representing the landing delay for the aircraft under consideration at the arrival airport or the congestion parameter representative of the congestion at the arrival airport per future time interval. In the embodiment in which the non-explicit parameter is the instantaneous global congestion parameter, the global congestion parameter Q may be represented by an occupancy level of the runways of the arrival airport with respect to the maximum capacity of the arrival airport, for each time slot (for example, a quarter of an hour or an hour).

As shown in FIG. 4, the neural network 2A of the first predictor 101 may be activated by a set of inputs that may comprise:

- The estimated time of arrival range;
- The number of aircraft arriving per category;
- The number of aircraft arriving per category over a preceding time range.

Figure 5:
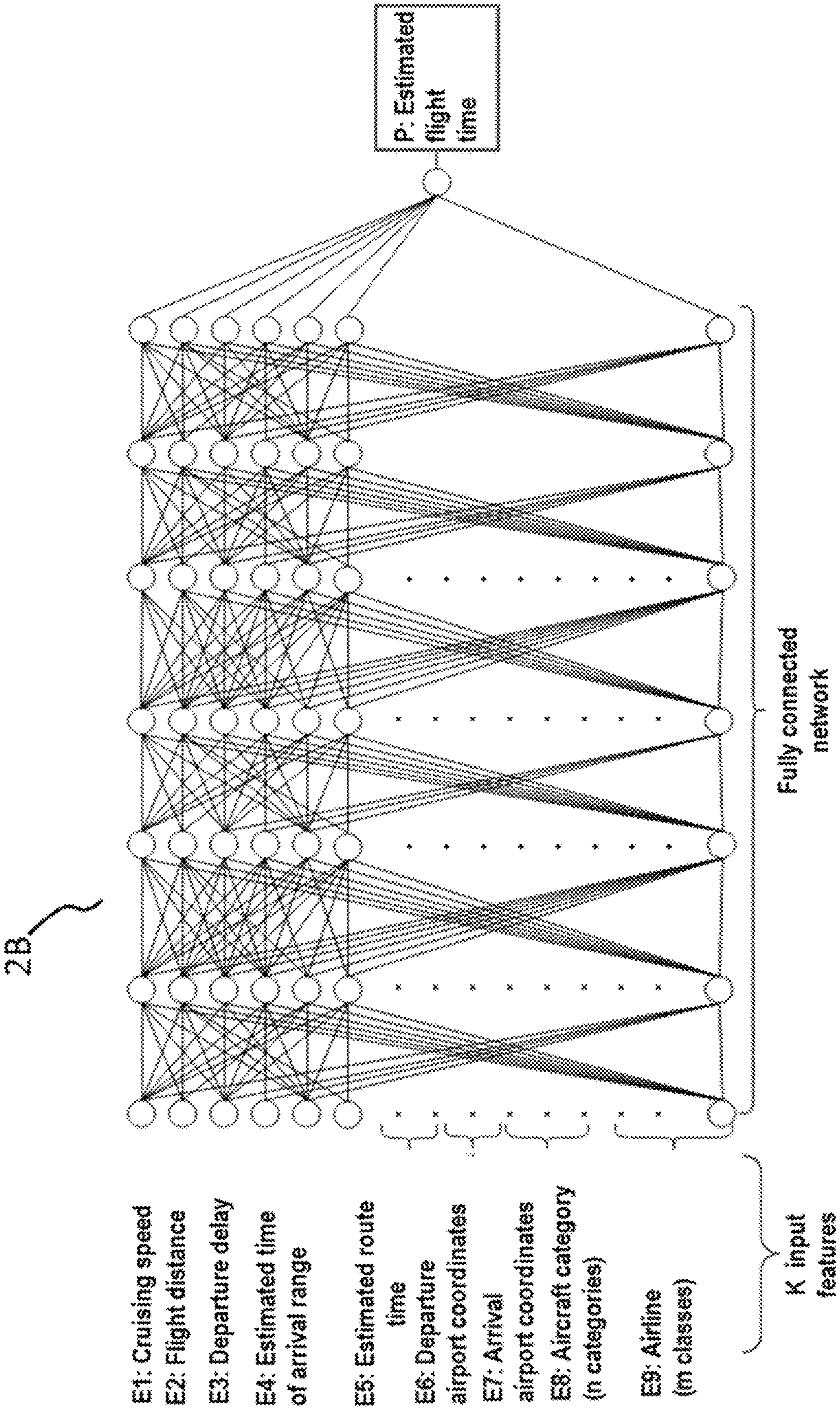
FIG. 5 shows the second neural network-based predictor, according to the exemplary embodiment of FIG. 6.

FIG. 5 shows the second neural network 2B-based predictor 102, in the application of the invention to predicting the estimated time of arrival ETA of an aircraft on a route between an arrival airport and a departure airport.

The second predictor 102, based on a neural network 2B, supplies a prediction of the ETA of the flight under consideration at output.

The second predictor 102 may receive, at input, data relating to the flight plan of the aircraft, the weather conditions forecast on the route, and/or landing time slot information as computed for the aircraft before the aircraft takes off. Advantageously, the second predictor 102 receives, at input, the non-explicit parameter Q determined at output of the first predictor 101 (for example, the instantaneous global delay parameter). The second predictor 102 may furthermore receive, at input, historical data regarding values of the non-explicit parameter Q output by the first predictor 101 over a past time period.

In one embodiment applied to estimating the flight time of an aircraft, the input data of the second predictor 102 may comprise:

- The estimated time of arrival range;
- The estimated en-route time (or 'estimated route time'), the estimate of this time being computed before the aircraft takes off using calculation-based formulas;
- Data regarding a flight history, stored for example in a database or a cache, the history data relating to previous flights corresponding to the route of the flight under consideration (between the originating location and the destination location) over past time windows; the history may include information relating to a multitude of previous flights (millions of flights for example);
- The distance between the departure airport (at the departure location) and the arrival airport (at the arrival location) corresponding to the route of the aircraft under consideration ('Flight Distance');
- The take-off delay ('Departure delay') predicted at the time of take-off (this may be transmitted by the aircraft in the last message sent by the aircraft at the time of take-off); the delay corresponds to the difference between the actual take-off time and the initially scheduled take-off time (Estimated take-off time).

In the example of FIG. 5, the input data of the second predictor 102 comprise for example a set of K' input features including:

- E1: The cruising speed of the aircraft under consideration;
- E2: The flight distance;
- E3: The departure delay;
- E4: The estimated time of arrival range (range of estimated arrival times);
- E5: The estimated route time (Estimated En Route Time);
- E6: The coordinates of the departure airport (in the form of Latitude, Longitude and Altitude coordinates for example);
- E7: The coordinates of the arrival airport (in the form of Latitude, Longitude and Altitude coordinates for example);
- E8: An aircraft category class, encoded using n classes (n=6 for example);
- E9: The airline category, encoded using m classes (m=15 for example).

The predictors 101 and/or 102 may be implemented by any form of neural network (such as convolutional networks, fully connected networks, etc.).

In one embodiment, the first predictor 101 may furthermore be configured so as to broadcast the output parameter Q to the control systems of a plurality of aircraft that are currently en route to sectors neighboring the arrival airport, using appropriate communication means. The communication means may include one or more private and/or public networks that allow data to be exchanged, such as the Internet, a local area network (LAN), a virtual local area network (VLAN), a wide area network (WAN), a voice/data cellular network, air-to-ground communication such as CPDLC (acronym for 'Controller Pilot Data Link Communications') and/or other types of communication networks of this kind. Each communication network may use normal communication technologies and/or protocols such as HTTP (HyperText Transport Protocol). In such an embodiment, the prediction device 100 may be configured so as to fine-tune the estimate of the value predicted for the variable P forming the response of the second predictor 102 using an initial estimate of the time of arrival ETA computed from the speed, the route and the physical parameters of the aircraft, this initial estimate being made when a flight plan is submitted, or intermediate estimates of the time of arrival that are computed from a formula or performed by the device 100 at a past time.

Figure 6:
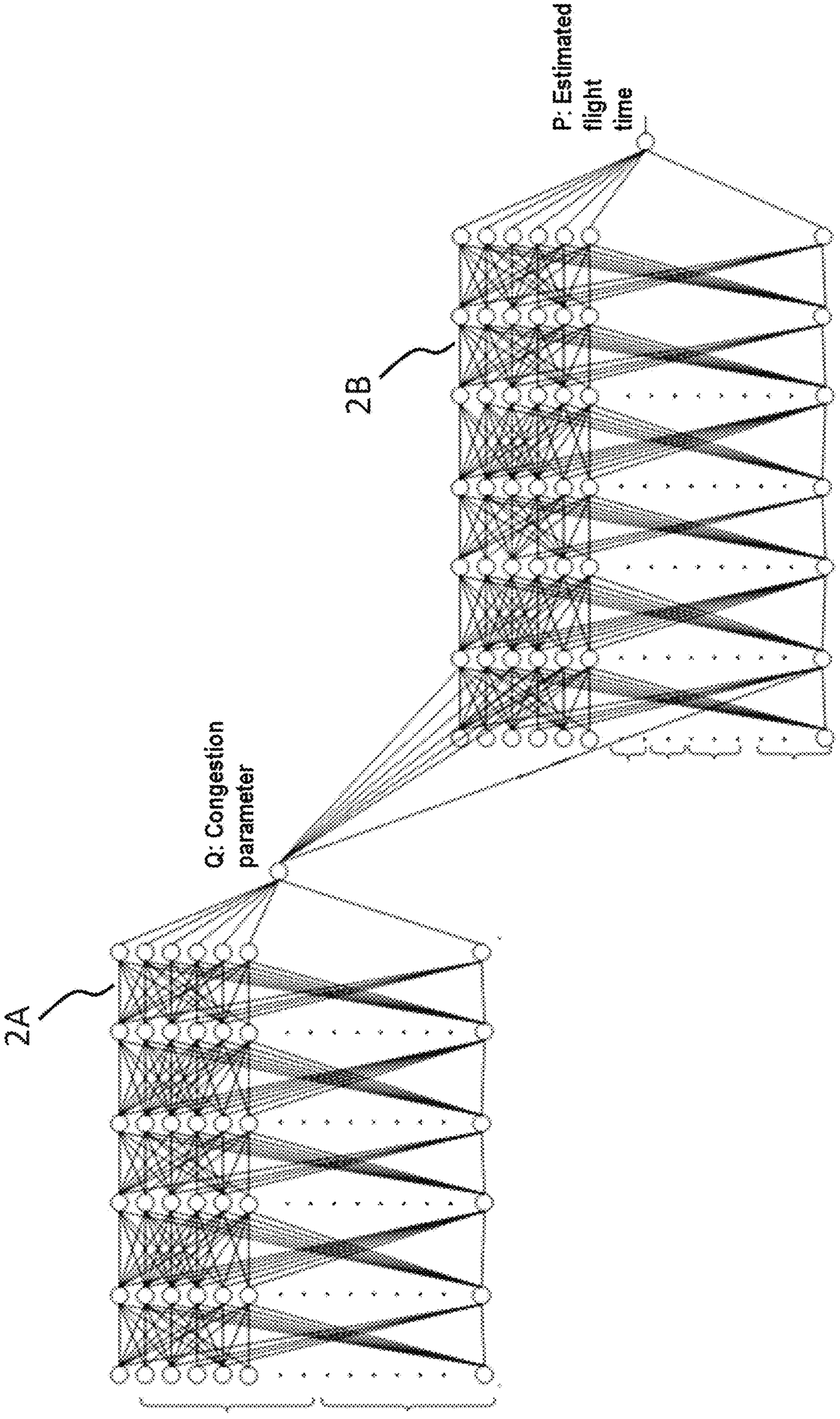
FIG. 6 shows the interactions between the first predictor and the second predictor in the learning phase, according to the exemplary embodiment of FIGS. 5 and 6.

FIG. 6 shows the interactions between the first predictor 101 and the second predictor 102 in the learning phase. The output Q of the first predictor 101, in this example, represents the congestion at the arrival airport, which has no available ground truth and therefore cannot be trained independently by a separate learning function. According to the embodiments of the invention, the non-explicit output Q of the first predictor 101 is supplied at input of the second predictor 102, while, in the learning phase, the two predictors 101 and 102 are trained jointly using a single learning function for the two neural networks 2A and 2B, thereby making it possible to reliably and accurately predict the value of the variable P (ETA in the example under consideration) despite the non-explicit nature of the parameter Q. In one embodiment, it may be advantageous to normalize samples during the backpropagation between the two networks, in order to improve the joint learning of the two neural networks. Such an arrangement of the two predictors makes it possible to capture the impact of the non-explicit parameter on the second predictor 102 in the learning phase. It furthermore makes it possible to provide a network (network of the first predictor 101) capable of predicting the non-explicit parameter in a way that also maximizes the accuracy of the second predictor 102, without it being necessary to define an analytical function for this parameter.

Figure 7:
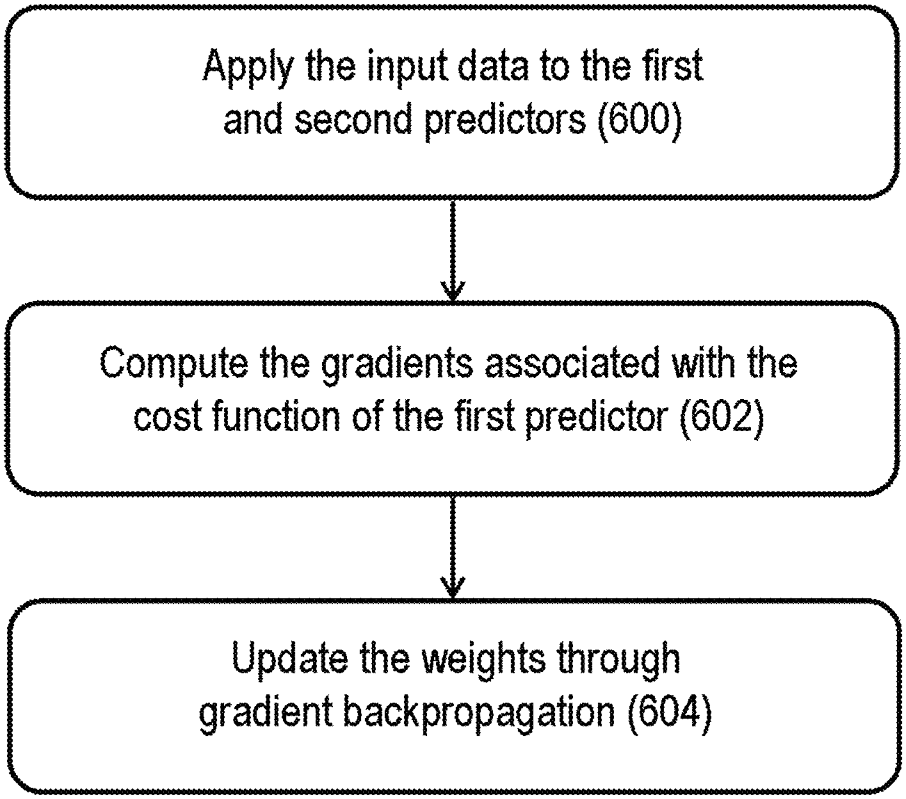
FIG. 7 is a flowchart showing the learning method for training the two predictors, according to some embodiments.

FIG. 7 shows the learning method for training the two predictors 101 and 102, according to some embodiments.

The learning method comprises at least one iteration of the following steps:

- In step 600, input data are applied to the input of the two predictors 101 and 102;
- In step 602, a forward propagation is performed, in which gradients of a set of minimization functions for minimizing the cost function of the first predictor 101 are computed, in response to the application of the input data of the two predictors 101 and 102 and to the responses obtained by the neural networks of the predictors 101 and 102;
- In step 604, the weights of the neural networks of the two predictors 101 and 102 are updated by backpropagating the gradients computed in step 602.

A plurality of iterations of steps 600 to 604 may then be performed.

Figure 8:
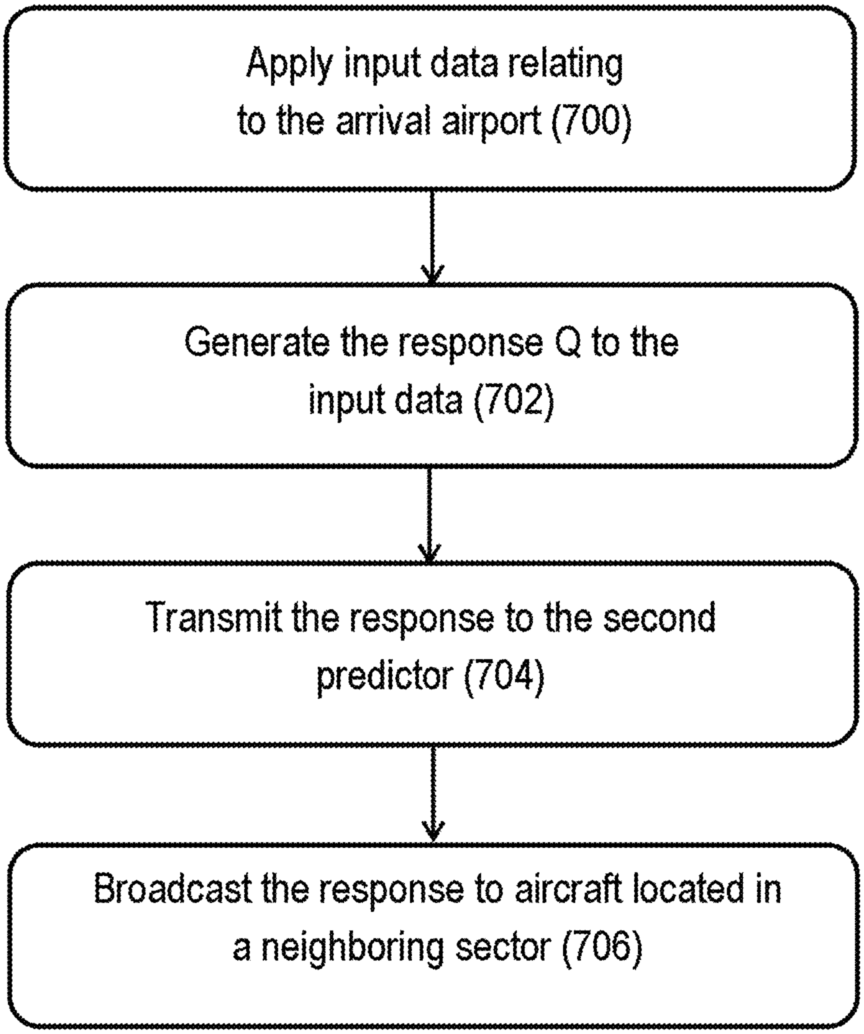
FIG. 8 is a flowchart showing the method for predicting the non-explicit quantity implemented by the first predictor, in a generalization phase, according to one embodiment.

FIG. 8 shows the method for predicting the non-explicit quantity Q implemented by the first predictor 101, in the generalization phase (after the learning phase), from multiple parameters, according to one embodiment, in one exemplary application of the invention to estimating the flight time of an aircraft.

The synaptic weights of the neural network that are used by the first predictor 101 are fixed in the generalization phase (static).

In step 700, input data relating to the arrival airport are applied to the first predictor. These input data may comprise:

- capacity information relating to the arrival airport; and or
- control system outputs (data for optimizing aircraft arrivals);
- the number and type of aircraft expected (ETA per aircraft) in a given time window.

In step 702, the output parameter Q of the first predictor (for example instantaneous global delay parameter) is generated based on the received inputs (response to input data applied to the neural network of the predictor 101).

In step 704, the response (output parameter Q) of the first predictor is transmitted to the second predictor.

In step 706, the output parameter Q may furthermore be broadcast to all of the control systems of the aircraft en route to sectors neighboring the arrival airport, using suitable communication means.

Although steps 704 and 706 are shown consecutively, in one embodiment, these two steps may be performed in a different order or substantially in parallel.

Figure 9:
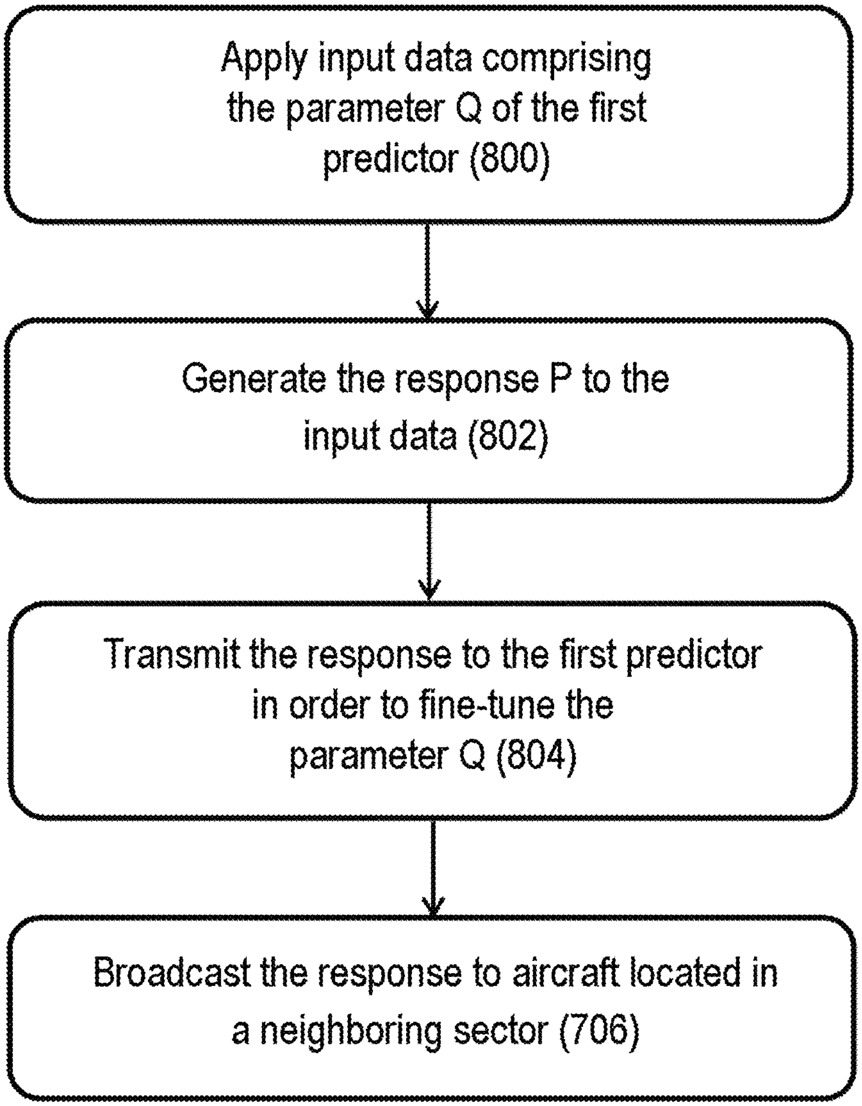
FIG. 9 shows the method for predicting the value of a variable implemented by the second predictor, in the generalization phase, according to one embodiment.

FIG. 9 shows the method for predicting the value of the variable P (the ETA of an aircraft in this example) implemented by the second predictor 102, in the generalization phase, from the non-explicit parameter Q (the instantaneous global delay parameter in this example) transmitted by the first predictor 101, according to one embodiment.

In step 800, a set of input data are applied to the second predictor 102, comprising at least the output parameter Q of the first predictor 101 (which may be for example the instantaneous global delay parameter).

In step 802, the neural network of the second predictor 102 generates an output P in response to the input data, this output representing a prediction of the variable P (ETA of the aircraft under consideration for example).

In step 804, the estimate P may be returned to the input of the first predictor 101, which, in response to this input datum, is able to fine-tune the estimate Q (by reiterating steps 700 to 704). In each iteration of the prediction of the value P, all of the input parameters may be updated (for example weather parameters) in order to improve the accuracy of the prediction. The predictions of the value P may be iterated periodically, with a chosen period (for example every N minutes during the flight duration for an estimate of an ETA).

In the embodiments described above in relation to one exemplary application of the invention to an ETA prediction, the neural network 2A of the first predictor 101 may receive, at input, data relating to a set of airports, by way of non-limiting example.

Figure 10:
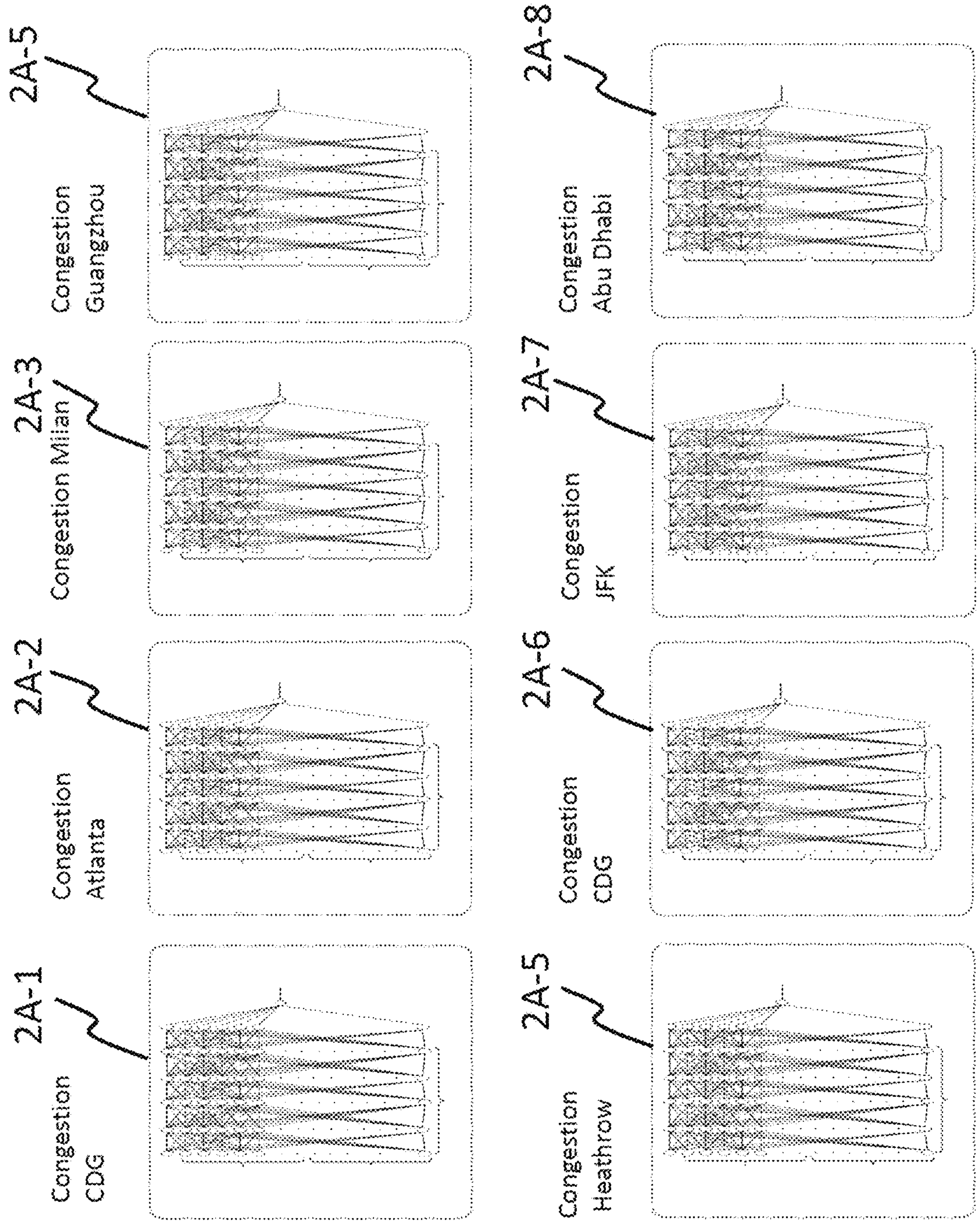
FIG. 10 shows a plurality of elementary neural networks used by the first predictor to take account of specific data, according to one exemplary embodiment.

As a variant, the prediction may be improved by using, for the first predictor 101, a plurality of elementary neural networks 2Ai each relating to a specific airport, as illustrated in the example of FIG. 10.

FIG. 10 shows for example 8 elementary neural network (2A-1 to 2A-8)-based predictors 101, each neural network being specific to a given airport (CGE, Atlanta, Milan, Guangzhou, Heathrow, CdG, JFK, Abu Dhabi). Each elementary neural network 2A-i is trained jointly with the second predictor 102 as described above using the input data specific to the associated specific airport, thereby making it possible to update the weights associated with each elementary neural network during learning. The weights of each elementary neural network 2A-i are fine-tuned using only the data that correspond solely to the associated specific airport.

In the generalization phase, the weights of the various neural networks 2A-i and 2B are frozen and, for each aircraft flight under consideration between a departure airport and an arrival airport, only the neural network 2A-i corresponding to the arrival airport of the aircraft is used.

Those skilled in the art will understand that the systems or subsystems according to the embodiments of the invention may be implemented in numerous ways by hardware, software or a combination of hardware and software, notably in the form of program code that may be distributed in the form of a program product, in numerous forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

Moreover, the invention is not limited to the embodiments described above by way of non-limiting example. It encompasses all of the variant embodiments that may be contemplated by those skilled in the art. In particular, those skilled in the art will understand that the invention is not limited to the prediction of ETA variables or more generally to air traffic control, and may be applied to other fields. Those skilled in the art will understand that the invention is not limited either to the examples of cost functions and minimization functions for minimizing cost functions described above.

The invention claimed is:

1. An air-traffic control system comprising a device for predicting a value of a control variable intended to be used by said control system, the control variable P depending on multiple parameters, the parameters comprising a non-explicit parameter Q, wherein the prediction device comprises a first neural network-based predictor configured to compute an estimate of said non-explicit parameter and a second neural network-based predictor configured to compute an estimate of the value of the control variable P from the estimate of the non-explicit parameter Q, the two predictors receiving an input dataset, each neural network being associated with a set of weights, the prediction device being configured to jointly train the two predictors, in a training phase, by applying a plurality of iterations of a single learning function to the two predictors to determine the weights of said first neural network-based predictor and said second neural network-based predictor, wherein the control variable P is an estimated time of arrival, ETA, of a given aircraft, for a trajectory between a departure point and an arrival point, the non-explicit parameter Q being a parameter whose value is related to the ETA, the learning function comprising:

a forward propagation block configured to compute, in response to the input datasets being applied to the two predictors, a gradient of a minimization function for minimizing a cost function of the first predictor; and a backpropagation block, configured to update at least some weights of the neural networks of the two predictors by backpropagating the gradients computed by the forward propagation block, wherein the prediction device is configured to estimate the value of the control variable at a future time, in a generalization phase, after said iterations of the learning function, by applying input data to the neural networks of the two predictors using said weights determined in the training phase, the input data applied to the two predictors in the generalization phase being different, the input data applied to the second neural network-based predictor in the generalization phase comprising at least the estimation of the non-explicit parameter Q provided at an output of the first neural network-based predictor, and wherein the control system being configured to use said estimated value of the control variable P to perform air-traffic control.

2. The control system as claimed in claim 1, wherein the backpropagation block is configured to update the weights of the second predictor, while the weights of the first predictor are fixed.

3. The control system as claimed in claim 1, wherein the first predictor comprises a neural network receiving input data.

4. The control system as claimed in claim 1, wherein the first predictor comprises a set of neural networks, each receiving specific input data.

5. The control system as claimed in claim 1, wherein the second predictor is configured to apply a predicted value at input of the first predictor.

6. The control system as claimed in claim 1, wherein the first predictor is configured to broadcast an output value of the non-explicit parameter to external systems using communication means.

7. The control system as claimed in claim 1, wherein the non-explicit parameter is a congestion level at the arrival point.

8. The control system of claim 7, wherein the output of the first predictor is represented in a form of a prediction table supplying a congestion level for an arrival airport per future time interval.

9. The control system as claimed in claim 1, wherein the non-explicit parameter is a global delay parameter.

10. The control system as claimed in claim 1, wherein the input data of the first predictor comprise features relating to said given aircraft, information relating to aircraft arriving at the arrival point, and the maximum number of aircraft associated with the arrival point.

11. The control system as claimed in claim 10, wherein the input data relating to aircraft arriving at the arrival point comprise a number and type of aircraft expected to land at the arrival point per time range.

12. The control system as claimed in claim 1, wherein the input data of the second predictor comprise features relating to said given aircraft, information relating to aircraft arriving at the arrival point, and capacity information associated with the arrival point.

13. The control system as claimed in claim 1, wherein the input data of the second predictor comprise a time slot representing an expected landing range for said given aircraft, and a history of values of the non-explicit parameter over a past time period.

14. An air-traffic control system comprising a device for predicting a value of a control variable intended to be used by said control system, the control variable P depending on multiple parameters, the parameters comprising a non-explicit parameter Q, wherein the prediction device comprises a first neural network-based predictor configured to compute an estimate of said non-explicit parameter and a second neural network-based predictor configured to compute an estimate of the value of the control variable P from the estimate of the non-explicit parameter Q, the two predictors receiving an input dataset, each neural network being associated with a set of weights, the prediction device being configured to jointly train the two predictors, in a training phase, by applying a plurality of iterations of a single learning function to the two predictors to determine the weights of said first neural network-based predictor and said second neural network-based predictor wherein the control variable P is an Estimated Time of Overflight, ETO corresponding to an arrival time of a given aircraft to an intermediary point of its trajectory, the non-explicit parameter Q being a parameter whose value is related to the ETO, the learning function comprising:

a forward propagation block configured to compute, in response to the input datasets being applied to the two predictors, a gradient of a minimization function for minimizing a cost function of the first predictor; and a backpropagation block, configured to update at least some weights of the neural networks of the two predictors by backpropagating the gradients computed by the forward propagation block, wherein the prediction device is configured to estimate the value of the control variable at a future time, in a generalization phase, after said iterations of the learning function, by applying input data to the neural networks of the two predictors using said weights determined in the training phase, the input data applied to the two predictors in the generalization phase being different, the input data applied to the second neural network-based predictor in the generalization phase comprising at least the estimation of the non-explicit parameter Q provided at an output of the first neural network-based predictor, and wherein the control system being configured to use said estimated value of the control variable P to perform air-traffic control.

* * * * *